44-122 SF
TR01 03 4 115

United States Statutory Invention Registration [19]

[11] Reg. Number: H115
[45] Published: Aug. 5, 1986

Lorch

[54] ARM RESTRAINT SYSTEM FOR HARNESS MOUNTING

[75] Inventor: Daniel L. Lorch, Holland, Pa.

[73] Assignee: The United States of America as represented by the Secretary of the Navy, Washington, D.C.

[21] Appl. No.: 831,029

[22] Filed: Feb. 3, 1986

[51] Int. Cl.[4] ..... B64D 11/06; B64D 17/30; B64D 25/02

[52] U.S. Cl. ..... 244/~~122 A~~; ~~244/151 A~~

[56] References Cited

U.S. PATENT DOCUMENTS

| | | |
|---|---|---|
| 2,829,850 | 4/1958 | Culver . |
| 3,083,938 | 4/1963 | Brinkworth et al. . |
| 3,737,126 | 6/1973 | Martin . |
| 4,081,156 | 3/1978 | Ideskär . |
| 4,337,913 | 7/1982 | Booth . |
| 4,339,098 | 7/1982 | Tardot et al. . |
| 4,359,200 | 11/1982 | Brevard et al. . |
| 4,428,102 | 1/1984 | Brownell . |

*Primary Examiner*—Charles T. Jordan
*Attorney, Agent, or Firm*—Robert F. Beers; Henry Hansen

[57] ABSTRACT

A harness mounted arm restraint system for the occupant of an aircraft ejection seat to prevent the arms from flailing and being injured during ejection. Harness-mounted ribbons with slidable rings on them are hooked to snubber lines. The snubber lines are secured to the airframe of the aircraft so that when the seat ejects, the snubber lines pull the ribbons tightly around the upper arms and forearms of the seated occupant. The snubber lines then break away from the frame but the lines and ribbons are kept taut by a snubber block on the seat. The snubber lines are cut when seat and occupant separate.

6 Claims, 4 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ARM RESTRAINT SYSTEM FOR HARNESS MOUNTING

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to an arm restraint system for an occupant, such as an aircrewman, of an aircraft ejection seat, and more particularly to a system, suitable for harness mounting, for restraining the arms against the body during the ejection to prevent the arms from flailing and becoming injured.

Arm flail injury is one of the most common major injuries resulting from high speed ejection. The windblast that strikes the crewman can twist and bend his arms, causing fractures and dislocations.

Various prior art devices attempted to reduce these injuries by restraining the arms. However, they often do not adequately restrain the arms, or usually require substantial modification to the ejection seat. Some of these devices also require too much space for operation.

SUMMARY OF THE INVENTION

It is therefore an object of the invention to keep arms restrained against the body of a crewman ejecting from an aircraft to prevent injury due to flailing arms.

A further object of the invention is to provide an arm restraining system requiring minimal modification to the seat.

It is also an object to provide a simple and inexpensive restraining system that does not require much space.

Still another object of the invention is to provide a seat ejection system which deploys quickly.

Briefly, these and other objects and features of the invention are accomplished by a pair of ribbons fixed at their one ends to the parachute harness at either side midway between the occupant's waist and shoulders and at their other ends to the back of the harness at either side near the occupant's femur socket joints. The ribbons route through rings fixed to the harness near each of the occupant's pectoral muscles. When the seat ejects, a pair of snubber lines, each releasably fixed at one end to the floor of the aircraft and each slidably hooked at the other end to the ribbons near the pectoral muscles, pull ribbons downwardly and inwardly, tightening them about the occupant's upper arms and forearms. A snubber block connected to the lines keeps the ribbons taut after ejection and a cutter cuts them when the occupant and seat separate.

DESCRIPTION OF THE DRAWINGS

Other objects, advantages and novel features of the invention will become apparent from the following detailed description of the invention when considered in conjunction with the accompanying drawings wherein.

DESCRIPTION OF THE PREFERRED EMBODIMENT

Figure 1:
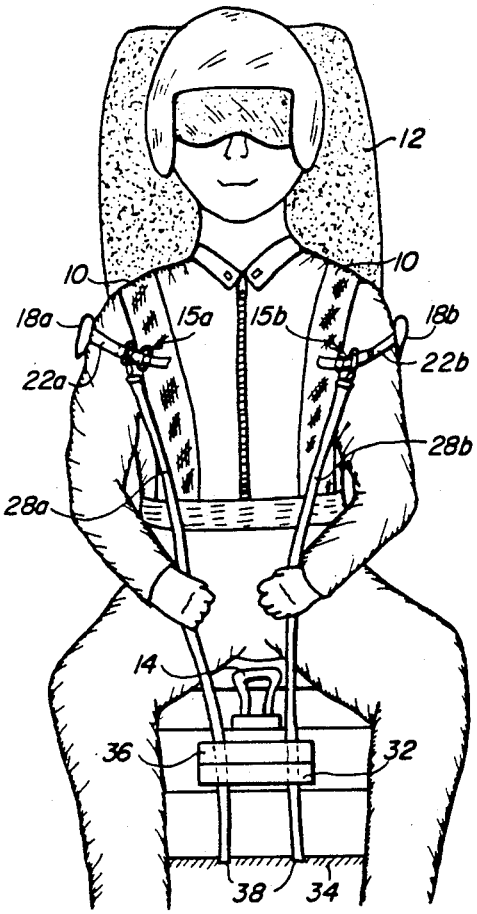
FIG. 1 is a front view of an arm restraint system according to the invention as worn by a crewman secured in an aircraft ejection seat.

Referring now to the drawings wherein like characters designate like or corresponding parts throughout the several views, there is shown in FIG. 1 a crewman in an aircraft ejection seat 12 wearing a conventional parachute harness 10. In the event of an emergency requiring egress of the crewman during flight, ejection is initiated by a hand-operated pull ring 14 positioned on the seat 12 between the thighs of the crewman.

Figure 2:
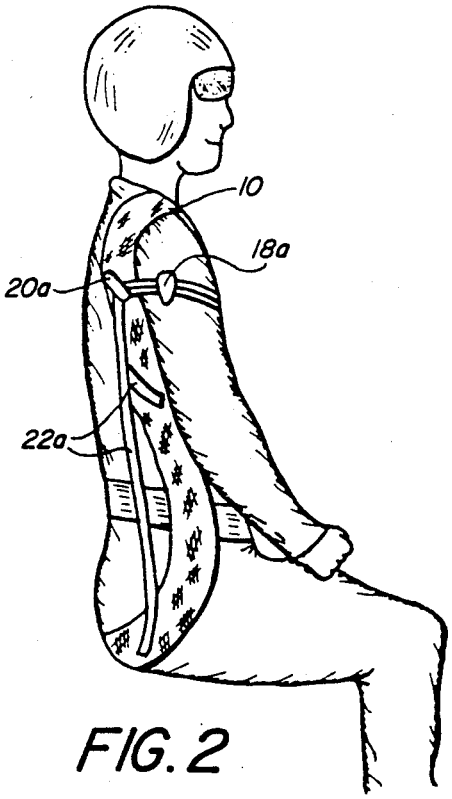
FIG. 2 is a side view of the arm restraint system according to the invention.

The arm restraint system of the present invention includes two connector assemblies 15*a* and 15*b* sewn to the front of parachute harness 10 below the right and left pectoral muscles, respectively; two breakaway loops 18*a* and 18*b*, such as Velcro, sewn to the right and left sleeves, respectively, of the crewman's outer garment near the shoulders; and two breakaway loops 20*a* (FIG. 2) and 20*b* (not shown) sewn to the back of harness 10 over the right and left shoulder blades, respectively.

Figure 3:
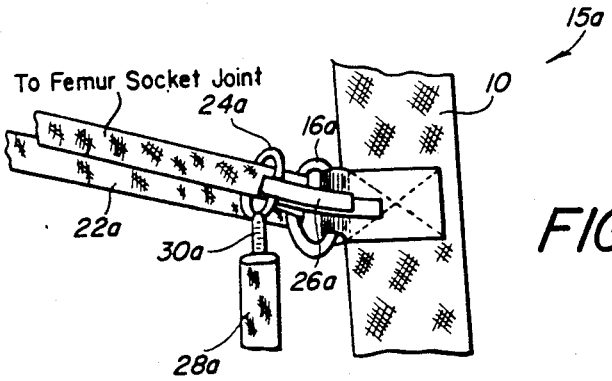
FIG. 3 is an enlarged fragmentary view of the arm restraint system of FIG. 1 near the shoulder.
Figure 4:
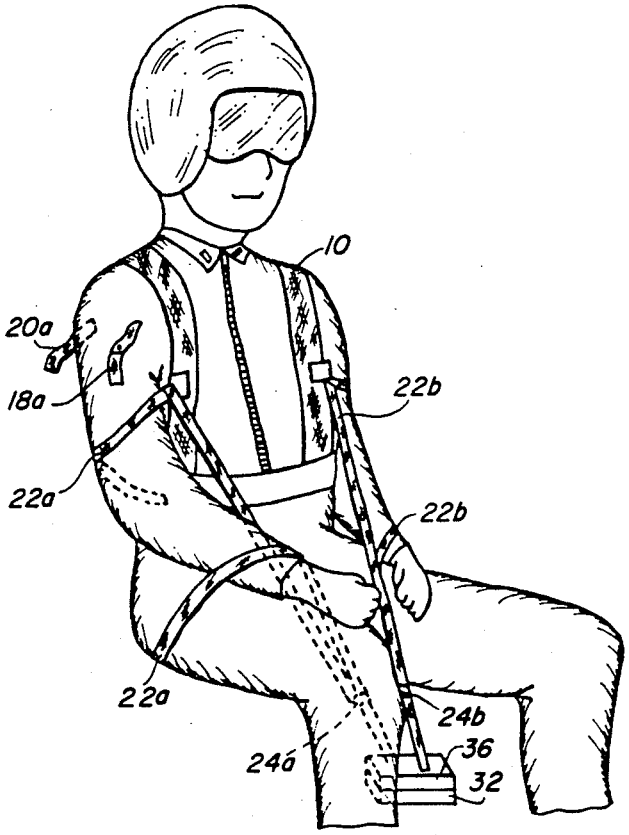
FIG. 4 is a perspective view of the arm restraint system fully deployed.

As shown in FIG. 3, assembly 15*a* includes a slidable ring 24*a* which rests on top of a ring 16*a*, and is held in place by a breakaway loop 26*a*. Assembly 15*b* similarly includes rings 16*b* and 24*b* and loop 26*b* (not shown). Ribbons 22*a* and 22*b*, each sewn at one end to harness 10 midway between the waist and the shoulders on the sides of the torso, route upwardly through their respective loops 20*a* and 20*b*, loops 18*a* and 18*b*, and rings 16*a* and 16*b*. Ribbons 22*a* and 22*b* then route back through loops 18*a* and 18*b* and loops 20*a* and 20*b*, terminating at the back of harness 10 at the right and left femur socket joints, respectively.

Snubber lines 28*a* and 28*b* are each hooked at one end to rings 24*a* and 24*b*, respectively, by snap-on fasteners 30*a* (FIG. 3) and 30*b* (not shown) and run downwardly through a snubber block 32 and a cutter 36 located between the crewman's legs and attached to the seat 12. The other ends of snubber lines 28*a* and 28*b* are secured to airframe 34 of the aircraft by breakaway rivets 38. Snubber block 32 is configured to permit lines 28*a* and 28*b* to slide downwardly therethrough but prevents upward movement, with cutter 36 severing lines 28*a* and 28*b* when seat/man separation is activated.

In operation, the aircrewman initiates ejection by pulling pull ring 14. This places his hands in the best entrapment position, although entrapment will also occur if the hands are on the thighs or on the flight control stick. As the seat 12 moves up the rails (not shown), the snubber lines 28*a* and 28*b* move down through the snubber block 32, pulling the slidable rings 24*a* and 24*b* free of breakaway loops 26*a* and 26*b*, respectively, and towards snubber block 32. Ribbons 22*a* and 22*b* detach from loops 18*a*, 20*a*, and 18*b*, 20*b*, respectively, and become taut. The arms may be restrained before seat ejection, if desired, by locating a retracting motor below snubber block 32 to pull snubber lines 28*a* and 28*b* down through snubber block 32. The upper portions of ribbons 22*a* and 22*b* route over the upper arms and through rings 16*a* and 16*b*, respectively, holding the upper arms against the torso. The lower parts of ribbons 22*a* and 22*b* extend from the femur socket joints over the forearms to the slidable rings 24*a* and 24*b*, holding the forearms against the thighs as the crewman enters the airstream.

When the force of the seat 12 ejecting reaches a specified level, rivets 38 break. Ribbons 22*a* and 22*b* and snubber lines 28*a* and 28*b* remain taut because the snubber block 32 holds the snubber lines 28*a* and 28*b* in place. Cutter 36 subsequently cuts the snubber lines 28*a* and 28*b* at the time of seat/man separation.

Some of the many features and advantages of the invention should now be readily apparent. For instance, the system secures the arms against the torso, deploying immediately upon ejection. Minimal modification to the seat is required. The system requires only enough space for the ribbons, the snubber lines, and the snubber block. It is also a simple and relatively inexpensive system.

Having thus described the invention, it will be apparent to those skilled in the art that various modifications can be made within the spirit and scope of the present invention. Accordingly, it is intended to encompass all such modifications.

What is claimed is:

1. An arm restraint system for an aircraft ejection seat occupant wearing a parachute harness, comprising:

a pair of ribbons attachable at their one ends to the harness at either side between the occupant's waist and shoulders and at their other ends to the back of the harness at either side over the occupant's femur socket joints;

securing means attachable to the harness for slidably routing each of said ribbons behind the occupant's arms and over the pectoral muscles; and deploying means operatively connected to said ribbons for pulling and keeping said ribbons taut about the occupant's upper arms and forearms during seat ejection, said deploying means automatically disengaging upon separation of the occupant from the seat.

2. An arm restraint system in claim 1 wherein said securing means further comprises:

a pair of rings attachable to the front of the harness at either side over the pectoral muscles for receiving respective ones of said ribbons; and a pair of back breakaway loops attachable to the back of the harness at either side over the shoulder blades for releasably receiving respective ones of said ribbons.

3. An arm restraint system as in claim 1 wherein said deploying means comprises:

a pair of snubber lines slidably connected at their one ends to respective ones of said ribbons along their lengths between the pectoral muscles and said other ends of said ribbons, adjacent to the pectoral muscles, and releasably connectable at their other ends to the aircraft between the occupant's legs;

gripping means positioned between the occupant's legs and operatively connected to said lines for preventing release of any tension applied to said lines upon ejection; and cutter means operatively connected to said lines for severing said lines upon separation of the occupant from the seat.

4. An arm restraint system for an aircraft ejection seat occupant wearing a parachute harness, comprising:

a pair of rings formed to be fixed to the front of the harness at either side below the occupant's pectoral muscles;

a pair of back breakaway loops formed to be fixed to the back of the harness at either side adjacent to the occupant's shoulder blades;

a pair of ribbons formed to be fixed at their one ends to the harness at either side midway between the occupant's waist and shoulders, each of said ribbons routing from said one end through respective ones of said back breakaway loops, rings and back through said back breakaway loops, their other ends terminating at and formed to be fixed to the back of the harness at either side adjacent to the occupant's femur socket joints;

a pair of snubber lines slidably connected at their one ends to respective ones of said ribbons along their lengths between said rings and said other ends of said ribbons, adjacent to said rings, and formed to be releasably connected at their other ends to the aircraft between the occupant's legs;

gripping means formed to be connected to the seat between the occupant's legs and operatively connected to said lines for preventing release of any tension applied to said lines upon seat ejection; and cutter means formed to be connected to the seat and operatively connected to said lines for severing said lines upon separation of the occupant from the seat.

5. An arm restraint system as in claim 4 further comprising:

a pair of side breakaway loops, one on the outside of each of the occupant's arms below the shoulder, for routing respective ones of said ribbons therethrough.

6. An arm restraint system as in claim 5 further comprising:

a pair of front breakaway loops, each attachable to the front of the harness near respective ones of said rings, for releasably securing said one ends of said snubber lines.

* * * * *